3,117,878
DEHYDRATED FRUIT JUICE
Louis H. Anderson, Oakland, Calif., assignor to Gerber Products Company, Oakland, Calif.
No Drawing. Filed Oct. 16, 1961, Ser. No. 145,468
3 Claims. (Cl. 99—206)

This invention relates to the dehydration of food. More particularly, it relates to the dehydration of fruit and the reconstitution thereof.

The principal object of the present invention is to provide a method whereby fruit juice may be continuously dried, such as in the form of sheets obtained by conventional drum drying techniques, and wherein the dried product is reconstitutible to its pre-processing consistency solely by the addition of water thereto. Further objects, features, and advantages of the present method will become apparent as the following detailed specification proceeds.

Fruit juice or fruit concentrate is not readily dried by conventional techniques. This is due to the relatively large amount of natural sugar present in fruit juice. Thus, when fruit juice or concentrate is dried on a drum drier, the sugar present prevents the formation of a sheet which can be easily removed by the drier's doctor blade or scraper. Instead of being able to remove a continuous dried sheet from the drier as with other types of foods, the dried fruit juice yields a gummy mass after heating which collects at the doctor blade and disrupts the drying operation.

In the drying of high sugar content food other than fruit juice, the same problem has been encountered. To overcome the problem with other foods, starch thickeners have been added to the food slurry to be dried. The starch thickened mass of high sugar content food, after being heated to gelatinize the starch, can then be dried on a drum drier for example, relatively free from the foregoing problem.

It has not been feasible to use this same approach with fruit juices however, since the starch thickener, after reconstituting the dried juice, imparted a thick consistency to the juice wholly unlike and uncharacteristic of fresh juices.

The present invention solves the problem of dehydrating juices and permitting their reconstitution to their characteristic liquid form by combining an amylolytic enzyme with the dried, starch thickened juice. When water is added to the combination starch thickened juice and enzyme product, the starch is hydrolyzed by the enzyme to a sufficient degree to impart the desired consistency to the reconstituted product.

Thus, in a preferred embodiment the preferred invention provides a method for making a juice drink from dehydrated fruit juice which comprises drying fruit juice containing a starch thickener, combining an amylolytic enzyme with the juice after the drying step, and reconstituting the dried juice by combining it with water.

The reconstitution is conveniently carried out with the use of tap water. When tap water is added to the juice-enzyme mixture with moderate agitation, the product is ready for use normally in about 1–2 minutes.

In executing the present invention, drying of the fruit juice is accomplished by any of the well known techniques. For commercial operations the conventional drum drying procedures are contemplated.

One suitable way of carrying out the present method is to form a slurry with the selected fruit juice or concentrate with a starch thickener. Any of the common starches may be used for this purpose and include naturally occurring starches which are separated from the seed such as in corn, wheat, waxy maize, sorghum, and rice; those separated from the root such as tapioca, potato, and arrowroot; or those obtained from the stem, such as sago.

While the precise quantities to be employed will vary with the particular conditions and materials employed, one suitable operable range for the quantity of starch to be added is from about 35%–45% by weight of the fruit juice.

Suitably, the mixture of starch and fruit juice is heated with agitation to gelatinize the starch. The mixture is then suitably dried to a moisture content of about 1%–5%, although here again the precise moisture level after drying is subject to considerable variation.

Under the foregoing conditions, it is possible to drum dry fruit juices to form a continuous sheet that is conveniently handled for subsequent operations.

The dried product in accordance with the present method is then combined with an amylolytic enzyme. The quantity of enzyme to be used depends on the particular starch present, the quantity of starch employed, and the consistency of the final product that is desired. Generally, the enzyme may be added to the dried, thickened juice in an amount by weight of about .5%–.8% and an acceptable product will be obtained.

The dried product mixed with the enzyme is then ready for use by the consumer. The consumer merely need add a sufficient quantity of water to replace that which has been removed in the processing and a juice closely approximating that of the preprocessed fresh variety is obtained.

In general, any amylolytic enzyme may be combined with the dried juice. Although diastatic enzymes have been found to be extremely satisfactory, enzymes of bacterial origin which will liquify a starch paste may be used in the present process. Beneficially the enzyme selected should convert the starch in the dried juice to a relatively high percentage of sugars which thereby add to the overall nutritive and taste properties of the reconstituted juice beverage. However, any amylolytic enzyme which will liquify the starch is contemplated as being within the scope of the present method.

The present method is applicable to any fruit juice or to combinations thereof. The following examples illustrate the invention in relation to two particular juices.

*Example I*

The enzyme known by the trademark Rhozyme H–39 may be employed in this and the succeeding example. Rhozyme H–39 is a diastatic enzyme of bacterial origin, active up to 60–80° C., and for use with up to 60% starch materials. One part of the enzyme will liquify 20,160 parts of starch in one hour at 40° C. at a pH of 7.

A slurry was prepared from pineapple concentrate (60° Brix)—760 grams and Tenderfil Tapioca—200 grams. Sufficient water was added to form a slurry. The slurry was then heated to 190° F. and placed on a drum drier at 30 pounds steam pressure (260–265° F. surface temperature). The dried product was removed from the drum as a sheet, chilled to 40° F. or less, and mechanically flaked.

20 grams of the flakes, 10 grams of sugar, and 100 milligrams of enzyme were intermixed. The mixture was then combined with 118 cc. of water. A pineapple juice drink having a consistency substantially that of fresh pineapple juice was obtained.

*Example II*

A slurry was prepared from:

| | Grams |
|---|---|
| Pineapple concentrate (61° Brix) | 350 |
| Grapefruit concentrate (57° Brix) | 50 |
| Citric acid | 4.4 |
| Tenderfil Tapioca | 100 |

A slurry was obtained by combining the above ingredients with the necessary amount of water. The slurry was then heated to 190° F. and placed on a drum drier at 30 pounds steam pressure (260–265° F. surface temperature). The dried product was removed from the drum drier in sheet form and chilled down to about 40° F. The chilled sheet was then broken into flakes.

A sample was prepared by taking 13 grams of the flakes, 11 grams of sugar, and 100 milligrams of enzyme. The sample was combined with 118 cc. of water and a pineapple-grapefruit drink was obtained having a liqui-form consistency characteristic of juices.

Although the foregoing invention has been described in some detail by way of illustration and example for purposes of clarity of understanding, it is understood that certain changes and modifications may be practiced within in the spirit of the invention as limited only by the scope of the appended claims.

What is claimed is:

1. In the method of reconstituting a fruit juice drink from a dehydrated fruit juice containing a starch thickener by combining the dried juice with water, the improvement which comprises combining an amylolytic enzyme with the dried juice in an amount sufficient to liquify said starch thickener when the juice is combined with water.

2. The method in accordance with claim 1 wherein said starch thickener is about 35–45% by weight of the fruit juice drink, and said enzyme is a diastatic enzyme and is about .5–.8% by weight of said dried juice.

3. In the method for making a dehydrated fruit juice drink that is reconstitutable solely by the addition of water to a form substantially equal to the preprocessing consistency of the fruit juice from a dried, flaked sheet of fruit juice containing a starch thickener, the improvement which comprises mixing an amylolytic enzyme with the flakes in an amount sufficient to liquify the starch before reconstituting the flakes with water.

References Cited in the file of this patent

UNITED STATES PATENTS 2,393,561     Perech _____ Jan. 22, 1946

OTHER REFERENCES

"Chemistry of Carbohydrates," by Honeyman, 1948, Oxford Univ. Press, pp. 124–128.